United States Patent
Cegiel et al.

(10) Patent No.: US 10,889,530 B2
(45) Date of Patent: Jan. 12, 2021

(54) REACH-COMPLIANT PYROTECHNIC DELAYED-ACTION COMPOSITION AND PRIMER CHARGE HAVING VARIABLY SETTABLE PERFORMANCE PARAMETERS

(71) Applicant: RHEINMETALL WAFFE MUNITION GmbH, Unterluess (DE)

(72) Inventors: Dirk Cegiel, Stubben (DE); Ernest Schulz, Hamburg (DE); Julia Strenger, Hamburg (DE)

(73) Assignee: Rheinmetall Waffe Munition GmbH, Unterluess (DE)

( * ) Notice: Subject to any disclaimer, the term of this patent is extended or adjusted under 35 U.S.C. 154(b) by 274 days.

(21) Appl. No.: 15/983,376

(22) Filed: May 18, 2018

(65) Prior Publication Data

US 2018/0334413 A1    Nov. 22, 2018

Related U.S. Application Data

(63) Continuation of application No. PCT/EP2016/077014, filed on Nov. 8, 2016.

(30) Foreign Application Priority Data

Nov. 18, 2015  (DE) .................. 10 2015 014 821

(51) Int. Cl.
| | | |
|---|---|---|
| *C06B 33/00* | (2006.01) | |
| *C06B 23/00* | (2006.01) | |
| *C06C 9/00* | (2006.01) | |
| *F42C 9/10* | (2006.01) | |
| *C06C 5/06* | (2006.01) | |
| *F42B 3/16* | (2006.01) | |
| *D03D 23/00* | (2006.01) | |
| *D03D 43/00* | (2006.01) | |
| *C01G 49/02* | (2006.01) | |

(52) U.S. Cl.
CPC ............ *C06B 33/00* (2013.01); *C06B 23/001* (2013.01); *C06C 5/06* (2013.01); *C06C 9/00* (2013.01); *F42B 3/16* (2013.01); *F42C 9/10* (2013.01); *C01G 49/02* (2013.01)

(58) Field of Classification Search
USPC ...................... 149/37, 108.2, 108.6, 109.4
See application file for complete search history.

(56) References Cited

U.S. PATENT DOCUMENTS

| | | |
|---|---|---|
| 2,640,770 A | 6/1953 | Magram et al. |
| 3,480,489 A | 11/1969 | Olander |
| 3,713,852 A | 1/1973 | Wiley |
| 3,897,731 A | 8/1975 | Bowman |
| 4,484,960 A | 11/1984 | Rucker |
| 4,963,204 A | 10/1990 | Faber et al. |
| 5,088,412 A | 2/1992 | Patrichi |
| 5,236,526 A * | 8/1993 | Perotto ................. C06D 5/06 149/17 |
| 5,654,520 A | 8/1997 | Boberg et al. |
| 5,872,329 A | 2/1999 | Burns et al. |
| 6,224,099 B1 | 5/2001 | Nielson et al. |
| 6,227,116 B1 | 5/2001 | Dumenko |
| 7,721,652 B2 | 5/2010 | Yoshida et al. |
| 7,883,593 B1 | 2/2011 | Rose et al. |
| 8,092,623 B1 * | 1/2012 | Cramer ................. C06B 33/00 149/37 |
| 8,257,523 B1 * | 9/2012 | Puszynski ........... C06B 21/0008 149/109.6 |
| 2003/0145924 A1 | 8/2003 | Carter, Jr. |
| 2004/0048058 A1 | 3/2004 | Moore et al. |
| 2011/0239887 A1 * | 10/2011 | Sandstrom ............... C06C 7/00 102/204 |

FOREIGN PATENT DOCUMENTS

| | | |
|---|---|---|
| CA | 2061409 A1 | 8/1992 |
| DE | 1006770 B | 4/1957 |
| EP | 0332986 A1 | 9/1989 |
| EP | 0599792 A1 | 6/1994 |
| EP | 0847972 A1 | 6/1998 |
| EP | 1000916 A1 | 5/2000 |
| GB | 2168279 A | 6/1986 |
| JP | H 05-9088 A | 1/1993 |
| JP | 2000-026188 A | 1/2000 |
| JP | 2003-524565 A | 8/2003 |
| WO | WO9201655 A1 | 2/1992 |
| WO | WO 2010/044716 A1 | 4/2010 |

OTHER PUBLICATIONS

International Search Report dated Sep. 7, 2017 in corresponding application PCT/EP2016/077014.

* cited by examiner

*Primary Examiner* — James E McDonough
(74) *Attorney, Agent, or Firm* — Muncy, Geissler, Olds & Lowe, P.C.

(57) ABSTRACT

A pyrotechnic delayed-action composition and primer charge made of REACh-compliant components that are safe for humans and the environment. The delayed-action composition comprises at least one oxidant, at least one reducing agent, at least one filler and at least one mineral binder. The performance parameters thereof, in particular the burning time, can be set variably within a wide range. The composition clinkers on its own, thus preventing extinction at the front of the burning material even in dynamic conditions. The primer charge comprises at least one oxidant, at least one reducing agent, at least one filler and at least one mineral binder. It is easy to ignite and, due to its clinker structure, transfers its energy well to the compositions to be ignited. The delayed-action composition and the primer charge have the same structure and can easily be combined and adapted to each other in delayed-action units.

16 Claims, No Drawings

REACH-COMPLIANT PYROTECHNIC DELAYED-ACTION COMPOSITION AND PRIMER CHARGE HAVING VARIABLY SETTABLE PERFORMANCE PARAMETERS

This nonprovisional application is a continuation of International Application No. PCT/EP2016/077014, which was filed on Nov. 8, 2016, and which claims priority to German Patent Application No. DE 10 2015 014 821.4, which was filed in Germany on Nov. 18, 2015, and which are both herein incorporated by reference.

BACKGROUND OF THE INVENTION

Field of the Invention

The present invention relates to a pyrotechnic charge, namely a pyrotechnic delay composition and pyrotechnic primer charge, hereinafter referred to as primer charge and delay composition, respectively, composed of REACH (Registration, Evaluation, Authorisation and Restriction of Chemicals)-compliant constituents which are toxicologically unproblematical for human beings and the environment.

Description of the Background Art

Delay compositions are usually used in pyrotechnic delay units. Here, the delay compositions are pressed either directly into the articles/munition or into specific metal tubes which are then built as independent pyrotechnic assembly into many different pyrotechnic articles/types of munitions.

A number of delay compositions which are used for these purposes are known. Disadvantages of these compositions are, inter alia, that they contain substances which are toxicologically problematical for human beings and the environment, for example lead compounds, chromium compounds, nickel compounds, barium compounds or perchlorates.

It is known, for example from U.S. Pat. No. 7,883,593 B1, that mixtures of iron oxides and metal powders can be ignited and on burning produce liquid iron (known as thermites). A mixture having pulverulent iron oxide and zirconium can, for example compacted in tubes, easily be ignited, burns at a specific rate and produces a glowing composition which contains predominantly liquid iron.

Disadvantages of this thermite mixture are, inter alia, that due to the strongly exothermic reaction and the explosive burning it produces a very fluid slag which is easily flung out before it solidifies to form solid particles. In addition, the burning time can be controlled to only a very limited extent by changing the stoichiometric composition.

CA 2 061 409 for this purpose describes a delay composition having iron oxides and silicon, but it is possible to only a very limited extent to realize different delay times when using this mixture.

Furthermore, EP 0 847 972 A1 discloses a delay composition which can have different delay times as a result of different compositions.

Amounts and properties of the slag formed by burning delay compositions are of importance for reliable functioning. This applies particularly to fireable munitions, since here the burning front of the installed delay elements is open in certain types of munition due to their construction. The burning front is thus exposed directly to the stresses which occur during firing and during flight of the projectiles.

If the open-burning delay composition in a delay element produces too little slag, or if this slag is too fluid and does not solidify quickly enough, the stresses on firing the munition can lead to the slag being torn away from the burning front and the compacted delay composition no longer burning further. Munition failures which are not limited only to fireable munition occur.

Depending on the charge composition and the type of ignition, it can be necessary for a primer charge to be additionally pressed onto the delay composition pressed into the delay units. This is the case particularly when the delay composition burns slowly and the energy input by the primary ignition is low.

SUMMARY OF THE INVENTION

It is therefore an object of the present invention to provide a delay composition which does not have the abovementioned disadvantages. Its performance parameters, in particular the burning time, can be set variably in a wide range. It is self-slagging, as a result of which tearing-away of the burning front is prevented even under dynamic conditions. The constituents are toxicologically unproblematical for human beings and the environment and are REACH-compliant.

The delay composition is suitable for use in pyrotechnic delay units which display low-gas combustion. The burning time can be set in the range from 0.2 s/cm to 4.0 s/cm in pressed form by varying the mixing ratio of the charge constituents.

The delay composition has at least one oxidizing agent and at least one reducing agent, especially slag-forming and framework-forming additives, and also a mineral binder.

The oxidizing agent comprises primary iron oxides having different oxidation states of the iron. As reducing agent, zirconium and zirconium hydride are primarily used. In addition, ferrosilicon, ferrozirconium and boron can be present as secondary reducing agents. Iron alloys and tungsten are used as slag-forming additives. Aluminosilicates and silicate glasses are used as framework-forming additives, and these together with amorphous polysilicic acids bind the constituents of the charge.

The burning time and the slagging properties are controllable within a wide range as a function of the charge constituents defined in type and mass.

Thus, the volume of the slag formed from the products of the primary reaction of iron oxides and zirconium/zirconium hydride can be increased by addition or iron alloys such as ferrosilicon, ferrotungsten, ferrozirconium or tungsten. The invention provides for these iron alloys or the tungsten predominantly not to react with regard to the iron oxides as reducing agents but instead preferably to melt in the reaction zone of the burning composition together with the iron formed from the primary reaction, solidified to form a hard mass and thus fill up the volume of the burnt delay composition.

In the case of slow-burning delay compositions, in particular in the case of burning in cold conditions, it is also important that the heat energy liberated is not removed too quickly from the burning front. This is achieved by the molten slag being retained in the system and completely filling the reaction zone. This property is a prerequisite for even slow-burning delay compositions to continue to burn in the delay units in extremely cold conditions and dynamic stress, e.g. on firing.

In order for the molten slag to solidify very quickly, it has been found to be advantageous for part of the defined iron alloys to contain metals which have a melting point higher than that of iron (e.g. tungsten and zirconium).

According to the invention, it is also provided for the metals alloyed with the iron to react partially as secondary reducing agent with the iron oxide. For example, the compositions can be selected so that, when using ferrosilicon, part of the silicon reacts with the iron oxide in a secondary reaction.

The ignition sensitivity of the delay composition can be considerably improved by the use of boron as secondary reducing agent. In the case of very slow-burning mixtures, the use of boron can also ensure reliable further burning in the delay element under extremely cold conditions.

With regard to the framework-forming additives, it has been found that aluminosilicates, in particular the naturally occurring kaolinite, forms, during burning of the defined delay composition, a framework which can embed and retain the molten, predominantly spherical metal particles before the entire mass solidifies to form a solid slag.

Since the metallic iron formed or the iron alloys form physical bonds to the aluminosilicates only with difficultly, silicate glasses can additionally be added in the form of glass flour as framework-forming additive to the delay composition. The glass flour behaves like a type of "hotmelt adhesive". In the hot reaction zone of the burning delay composition, the silicate glasses melt, flow and on solidification adhesively bond the reaction products and additives to form a uniformly compact mass. The slag formed in this way has a porous structure, is very hard and its volume corresponds to at least that of the burnt delay composition.

Since delay compositions are usually processed as granular materials, these mostly contain a binder having an organic basis. When these delay compositions burn, gaseous reaction products, which are undesirable in the delay composition of the invention, are formed.

For this reason, a mineral binder which does not have these disadvantages and additionally promotes slagging of the burning composition is used in the delay composition of the invention.

It has been found that the pulverulent mixtures of the invention can very readily be processed together with silicate-rich water glass solutions by known methods to give granular materials. Here, both the chemical relationship of the alkali metal silicates dissolved in water with the framework-forming additives, aluminosilicates and silicate glasses, and also the chemical stability of all composition constituents in respect of alkaline media are advantageous. Chemical drying of water glass solutions by absorption of carbon dioxide forms the corresponding alkali metal carbonates and silicic acid which condenses to form amorphous polysilicic acids (silica gel). The silicate-rich water glass solutions thus represent a "mineral glue" which sticks together the constituents of the composition, in particular the aluminosilicates and silicate glasses.

In practice, various water glasses based on sodium, potassium and lithium are used. Since sodium and potassium water glass solutions form hygroscopic sodium carbonate or potassium carbonate during chemical drying and hygroscopic substances are undesirable in pyrotechnic charges, lithium water glass solution is preferably used as binder in the delay composition defined according to the invention. The lithium carbonate formed here during chemical drying is, in contrast, not hygroscopic.

There are a number of known delay compositions, e.g. on the basis of lead(II,IV) oxide/silicon or barium chromate/zirconium, which have different burning times depending on the percentage composition. However, a problem with these mixtures having different percentage compositions is that they are visually difficult to distinguish from one another from the outside.

In the production of delay units composed of a plurality of delay compositions having the same basis but different percentage compositions, there is therefore always the problem that they can be confused or accidently mixed. Complicated monitoring facilities or testing measures are necessary in order to ensure the quality of the delay units.

The delay composition of the invention does not have this disadvantage since the primary oxidizing agent can have different iron oxides, which are also known as iron oxide pigments. Owing to their characteristic intrinsic color, characteristic colors are also obtained for the delay composition as a function of the chemical make-up and burning time. On the basis of these colors the burning time of the delay composition can be assigned without risk of mistaken identity.

The delay time and the amount of gas formed during burning of the delay composition of the invention are also dependent on the hydrogen content of zirconium, so that these properties can also be varied by use of zirconium or zirconium hydrides having different hydrogen contents.

It is known that zirconium and zirconium hydrides have different mechanical, thermal and electrostatic sensitivities depending on the particulate properties and the hydrogen content. In the delay composition of the invention, these dependences can be utilized for improving the processing and handling safety.

As stated at the outset, it can, depending on the charge composition and the type of ignition, be necessary for an ignition charge to be additionally pressed into the delay composition pressed into the delay unit.

The present invention therefore likewise provides a primer charge which contains the same framework-forming additives and the same mineral binder as the delay composition of the invention.

As oxidizing agents, iron oxides having different oxidation states of the iron are used as in the delay composition of the invention.

As reducing agent, use is made of boron which can likewise be present as secondary reducing agent in the delay composition of the invention.

The almost identical chemical make-up of the delay composition and primer charge according to the invention, the difference between which lies in the percentage composition and qualitatively in the slag-forming additives which are absent in the primer charge, offers various advantages:

The chemical compatibility of the charges is ensured in this way.

Due to the same framework-forming components and the same mineral binders, the mechanical properties of the charges are very similar. This can be particularly advantageous when the charges are pressed together in combination in a delay unit. In this way, an optimal transition between the charges is ensured, which, due to the similar coefficients of thermal expansion, is also maintained in the event of temperature changes.

As a result of the easy ignitability of mixtures of iron oxides and boron, the ignition of the delay unit can be adapted as a function of the ignition impulse provided for the munition without the delay time, which is defined via the delay composition, being affected thereby.

Due to the framework-forming additives, the slag formed on burning is not flung out but instead remains in direct contact with the delay composition. Together with the similar mechanical properties of the two charges, optimal transition of ignition is ensured in this way.

It may be expressly pointed out that the primer charge of the invention can also be used, independently of the delay composition described, as primer charge in many different pyrotechnic articles/types of munitions.

Illustrative compositions for the delay composition of the invention (see table 1) and for the primer charge of the invention (see table 2) are shown below.

TABLE 1

Delay composition according to the invention

| Function in the delay composition | Chemical composition | |
|---|---|---|
| | Chemical | % by mass |
| Oxidizing agent, primary | Iron(III) oxide | 50 ± 20 |
| | Iron(II,III) oxide | 55 ± 20 |
| Reducing agent, primary | Zirconium | 30 ± 20 |
| | Zirconium hydride | 30 ± 20 |
| Reducing agent, secondary and/or | Ferrosilicon | 0-40 |
| | Ferrozirconium | 0-40 |
| slag-forming additives | Boron | 0-5 |
| Slag-forming additives | Ferrotungsten | 0-30 |
| | Tungsten | 0-30 |
| Framework-forming additives | Aluminosilicates | 6 ± 5.5 |
| | Silicate glasses | 5 ± 4.5 |
| Binder | Lithium water glass solution | 0.20 ± 0.15*) |

(*)Proportion of solid lithium water glass based on the mass of composition)

TABLE 2

Primer charge according to the invention

| Function in the primer charge | Chemical composition | |
|---|---|---|
| | Chemical | % by mass |
| Oxidizing agent | Iron(III) oxide | 70 ± 20 |
| | Iron(II,III) oxide | 70 ± 20 |
| Reducing agent | Boron | 15 ± 10 |
| Framework-forming additives | Aluminosilicates | 6 ± 5.5 |
| | Silicate glasses | 5 ± 4.5 |
| Binder | Lithium water glass solution | 0.20 ± 0.15*) |

(*)Proportion of solid lithium water glass based on the mass of the charge)

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A pyrotechnic primer charge or delay composition composed of REACH (Registration, Evaluation, Authorisation and Restriction of Chemicals)-compliant constituents which are toxicologically unproblematical for human beings and the environment, the pyrotechnic primer charge or delay composition comprising:
at least one oxidizing agent;
at least one reducing agent;
at least one additive that is slag or framework-forming; and
at least one mineral binder,
wherein the at least one mineral binder comprises amorphous polysilicic acids, and
wherein the amorphous polysilicic acids of the delay composition are processed with the aid of lithium water glass solutions to give granular material, such that the at least one mineral binder is not hygroscopic.

2. The pyrotechnic primer charge or delay composition as claimed in claim 1, wherein the oxidizing agent comprises iron oxides, iron(III) oxide (Fe2O3) and/or iron(II,III) oxide (Fe3O4 or FeO.Fe2O3).

3. The pyrotechnic primer charge or delay composition as claimed in claim 1, wherein the reducing agent comprises zirconium or zirconium hydride.

4. The pyrotechnic primer charge or delay composition as claimed in claim 3, wherein different hydrogen contents of the zirconium or zirconium hydride are provided for different delay times.

5. The pyrotechnic primer charge or delay composition as claimed in claim 3, further comprising an additional reducing agent, wherein ferrosilicon and/or ferrozirconium and/or boron is/are used as the additional reducing agent.

6. The pyrotechnic primer charge or delay composition as claimed in claim 1, wherein when the additive is slag-forming, the additive comprises various iron alloys or tungsten.

7. The pyrotechnic primer charge or delay composition as claimed in claim 1, wherein the delay composition comprises a tube as sheath, wherein the chemical make-up of the delay composition and also the particle size distribution of the constituents of the composition make a burning time of from 0.2 s/cm to 4 s/cm possible and in that the delay composition is compacted in a tube.

8. The pyrotechnic primer charge or delay composition as claimed in claim 7, wherein the compacted delay composition in the tube includes one or more mixture(s) and has a primer charge at one end.

9. The pyrotechnic primer charge or delay composition as claimed in claim 7, wherein the tube is formed of metal or ceramic.

10. The pyrotechnic primer charge or delay composition as claimed in claim 7, wherein the tube is formed of a combustible material.

11. The pyrotechnic primer charge or delay composition as claimed in claim 1, wherein the oxidizing agent comprises colored iron oxide pigments.

12. The pyrotechnic primer charge or delay composition as claimed in claim 1, wherein the reducing agent comprises boron.

13. The pyrotechnic primer charge or delay composition as claimed in claim 1, wherein the primer charge ignites a pyrotechnic delay composition or for other pyrotechnic charges.

14. The pyrotechnic primer charge or delay composition as claimed in claim 1, wherein the at least one reducing agent or an additional reducing agent is boron.

15. The pyrotechnic primer charge or delay composition as claimed in claim 1, wherein when the additive is a framework-forming additive, the additive comprises aluminosilicates and silicate glasses.

16. The pyrotechnic primer charge or delay composition as claimed in claim 1, wherein when the additive is a slag-forming additive, the additive comprises ferrotungsten.

* * * * *